United States Patent
Sugimoto et al.

(10) Patent No.: US 8,742,886 B2
(45) Date of Patent: Jun. 3, 2014

(54) MULTI UNIT CONTROLLER

(75) Inventors: Yuta Sugimoto, Hitachi (JP); Atsushi Nishioka, Tsukuba (JP); Eiji Kobayashi, Hitachinaka (JP); Akihiro Ohashi, Mito (JP); Katsumi Yoshida, Tokai (JP); Satoshi Nakamura, Hitachi (JP); Fumihiko Nemoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 523 days.

(21) Appl. No.: 13/165,972

(22) Filed: Jun. 22, 2011

(65) Prior Publication Data

US 2011/0320016 A1 Dec. 29, 2011

(30) Foreign Application Priority Data

Jun. 25, 2010 (JP) .................. 2010-144400

(51) Int. Cl.
*H05K 7/00* (2006.01)

(52) U.S. Cl.
USPC ......... 340/4.3; 341/174; 361/679.4; 361/729; 361/802; 361/803; 439/43; 439/638; 439/717; 700/19; 700/20

(58) Field of Classification Search
CPC .......... G05B 19/05; G05B 19/04; H05K 7/14; H05K 7/1422
USPC ......... 340/4.3; 341/174; 361/679.4, 729, 802, 361/803; 439/43, 638, 717; 700/19, 20
See application file for complete search history.

(56) References Cited

U.S. PATENT DOCUMENTS

| | | | | |
|---|---|---|---|---|
| 4,215,386 A | * | 7/1980 | Prager et al. | 361/679.4 |
| 4,247,882 A | * | 1/1981 | Prager et al. | 361/679.4 |
| 4,334,261 A | * | 6/1982 | Gonzales | 361/679.4 |
| 5,426,567 A | * | 6/1995 | Opeka | 361/740 |
| 5,615,106 A | * | 3/1997 | Yoshino et al. | 700/19 |
| 5,896,509 A | | 4/1999 | Sugimoto | |
| 6,704,815 B1 | * | 3/2004 | Morikawa et al. | 710/71 |

FOREIGN PATENT DOCUMENTS

| | | |
|---|---|---|
| JP | 01-264183 | 10/1989 |
| JP | 7-200011 | 8/1995 |
| JP | 2001-217016 | 8/2001 |
| JP | 2005-321943 | 11/2005 |
| JP | 2007-286862 | 11/2007 |
| JP | 2009-193437 | 8/2009 |

OTHER PUBLICATIONS

Office Action for Japanese Patent Application No. 2010-144400, mailed Jul. 9, 2013, with partial English translation of Office Action.

* cited by examiner

*Primary Examiner* — Jennifer Mehmood
*Assistant Examiner* — Andrew Bee
(74) *Attorney, Agent, or Firm* — Antonelli, Terry, Stout & Kraus, LLP.

(57) ABSTRACT

A multi unit controller has a plurality of base units each of which includes a control unit connector, a base unit connector through which the base units juxtaposed to each other are connected to each other, and a plurality of control units connected to the base units respectively through the respective control unit connector, wherein the base units juxtaposed vertically.

10 Claims, 7 Drawing Sheets

MULTI UNIT CONTROLLER

BACKGROUND OF THE INVENTION

The present invention relates to a controller, particularly to a multi unit controller having a plurality of control units connected to each other to form a programmable controller, a system controller or the like.

JP-hei-7-200011-A discloses a multi unit controller capable of being easily modified to change control units incorporated into the controller so that a desired system size is easily obtainable. In this multi unit controller, each of base plates mounted on respective electrically insulating bases 61 has base connectors on its respective side surfaces, and a control unit connector, so that the bases of desired total number are juxtaposed transversely (substantially horizontally) to be electrically connected to each other, and a control unit is connectable to each of the control unit connectors mounted on the respective bases. Therefore, the control units electrically connected to each other through the bases electrically connected to each other can communicates with each other. Further, an external device can be connected to each of the control units through a terminal base mounted on the control unit and connected to an external electric line. A duct holds the external electric line.

BRIEF SUMMARY OF THE INVENTION

In a conventional controller, an electric line is inserted into a controller chassis through a lower portion of the chassis so that the electric line is connected to a control unit in the controller. On the other hand, in the controller disclosed by JP-hei-7-200011-A, since the bases are juxtaposed transversely, the electric line extending from the lower portion to be connected to the control unit needs to be bent by a plurality of times. Since the electric line is thick and rigid, and generally a total number of the electric lines connected to each of the controller units is 20-40, a working time period for each bending of the electric lines is significantly long. Further, the dust needs to hold the electric lines extending transversely (substantially horizontally), so that a cost increases and a clearance in the chassis decreases.

Further, in the prior art, since the electric lines need to be connected directly to the terminal base mounted on the controller, when the control unit breaks down and needs to be replaced by another control unit, all of the electric lines need to be removed from the control unit and connected again to the another control unit.

An object of the invention is to provide a multi unit controller being capable of decreasing a time period for connecting an electric line to a control unit, having a simple structure, and enabling the control unit to be replaced by another control unit without removal of the electric line.

According to the invention, a multi unit controller comprises
a plurality of base units each of which includes a control unit connector, a base unit connector through which the base units juxtaposed to each other are connected to each other, and a plurality of control units connected to the base units respectively through the respective control unit connector, wherein the base units juxtaposed vertically.

The base unit connector may have an upper connector arranged on an upper surface of one of the base units, and a lower connector arranged on a lower surface of the other one of the base units to be connected to the one of the base units.

Each of the base units may include a terminal base through which the control unit is electrically connected to an electric line connected to an external equipment. The terminal base of one of the base units and the terminal base of the other one of the base units juxtaposed to the one of the base units may be opposite to each other in a direction perpendicular to another direction in which the other one of the base units are juxtaposed to the one of the base units.

The base unit connector may include an electric line connecting the base units to each other.

The controller may further comprise a controller chassis for receiving the base units, and a rail through which the base units are fixed to the controller chassis, and the rail and each of the base units are electrically connected to each other to discharge to the controller chassis electric noise applied to the control unit.

According to the invention, in the multi unit controller having the base units connected to each other, by juxtaposing the base units vertically, a total number of bendings of external electric line is decreased in comparison with the prior art wherein the base units are juxtaposed horizontally, and a duct for supporting the external electric line is not necessarily used. Further, since a terminal base is mounted on each of the base units to connect electrically the control unit to the external electric line through the terminal base, the control unit is not connected directly to the external electric line so that the external electric line does not needs to be removed from the control unit when exchanging the control unit.

Other objects, features and advantages of the invention will become apparent from the following description of the embodiments of the invention taken in conjunction with the accompanying drawings.

DETAILED DESCRIPTION OF THE INVENTION

Figure 1:
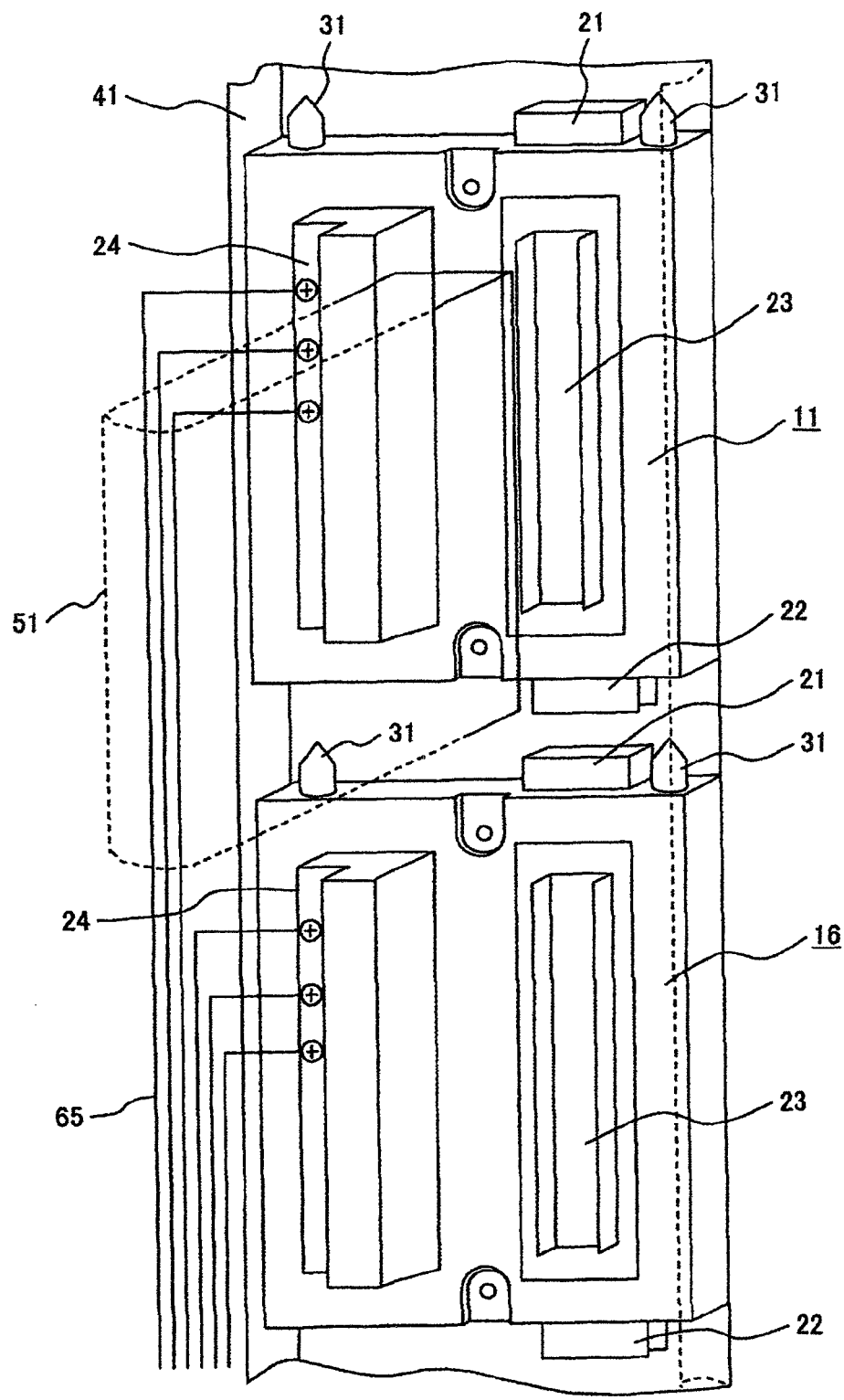
FIG. 1 is an oblique projection exploded view showing a main part of a controller as a first embodiment of the invention.

FIG. 1 shows a controller as a first embodiment of the invention having base units 11, 16 which are held by a rail 41 extending substantially vertically to juxtapose the base units 11, 16 vertically, control unit connectors 23 mounted on the base units 11, 16, terminal bases 24 mounted on the base units 11, 16 and capable of being connected to external electric lines 65, and control units 51 connected to the control unit connectors 23.

Each of the base units 11, 16 has cylindrical pins 31 on its upper surface, and pin receiver holes 32 of cylindrical shape on its lower surface to receive respectively the pins 31 so that the base units 11, 16 are connected to each other without a positioning and/or fitting error between the base units 11, 16.

Each of the base units 11, 16 further has a base unit connector 21 on the upper surface, and a connector receiver 22 on its lower surface so that the base units 11, 16 are electrically connected to each other.

Figure 2:
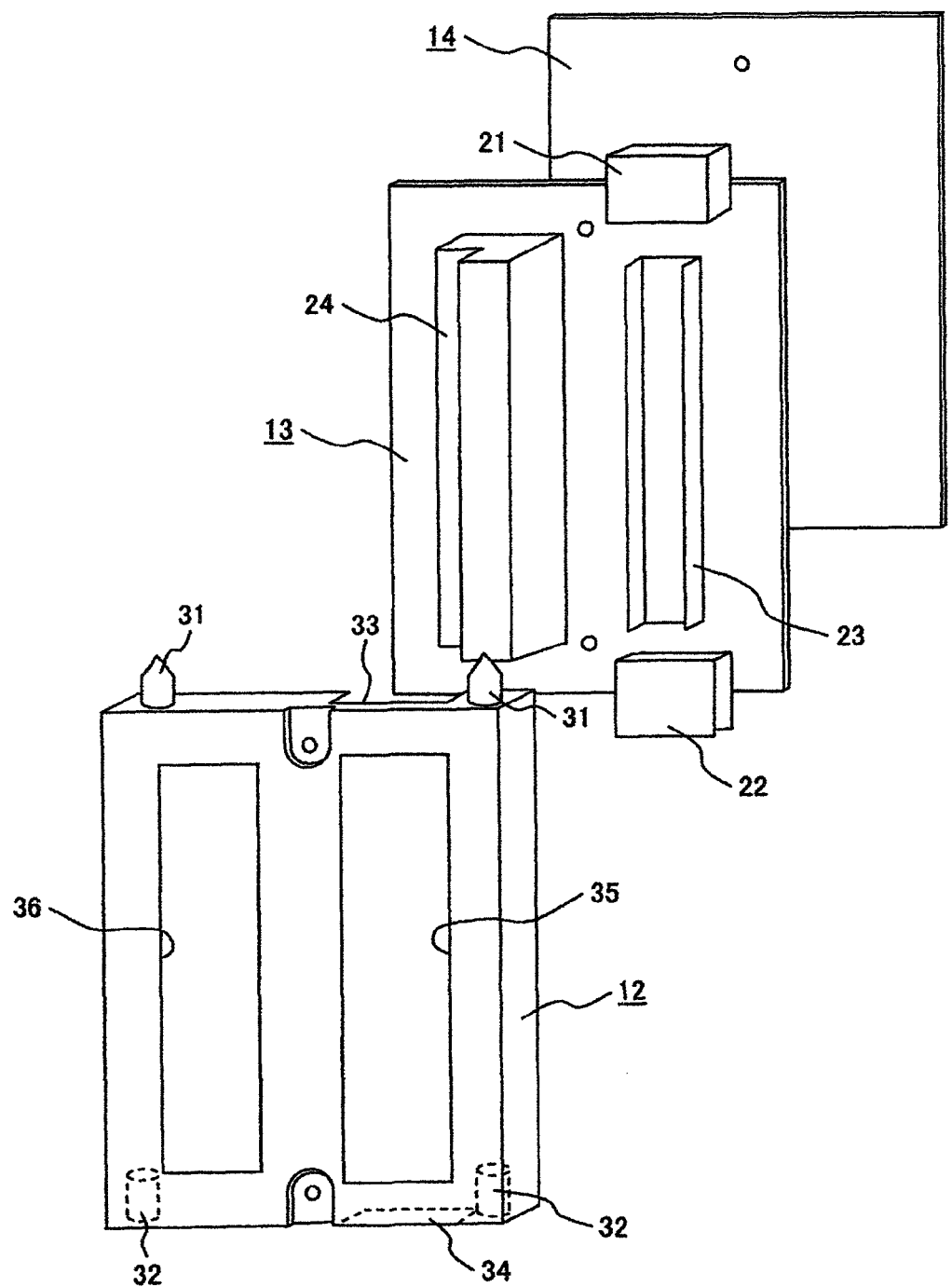
FIG. 2 is an oblique projection exploded view showing a base unit of the first embodiment.

As shown in FIG. 2, each of the base units 11, 16 has a base plate 13 including a case 12 covering a front surface of the base plate 13 and a back panel 14 covering a back surface of the base plate. The case 12 has a slit 33 through which the base unit connector 21, a slit 34 through which the connector receiver 22 extends, a slit 35 through which the control unit connectors 23 extends, and a slit 36 through which the terminal base 24 extends.

The pins 31 are arranged on an upper surface of the case 12, and the pin receiver holes 32 open on an lower surface of the case 12 so that the pin receiver holes 32 receive respectively the pins 31 when the base units 11, 16 are connected to each other.

In FIG. 2, the base unit connector 21 and the connector receiver 22 are electrically connected to each other through electric wires on the base plate 13. The connector receiver 22 has terminals (not shown), and the base unit connector 21 has holes (not shown) for receiving the terminals.

Each of the base units 11, 16 is electrically connected to the control unit 51 through the control unit connector 23 which is mounted on each of the base units 11, 16, and is electrically connected to each of the base unit connector 21 and the connector receiver 22 through the electric wires on the base plate 13.

The external electric lines 65 are electrically connected to the control unit 51 mounted on each of the base units 11, 16 through the terminal base 24 mounted on the base plate 13. The terminal base 24 is electrically connected through the electric wires on the base plate 13 to the control unit connector 23 mounted on the base plate 13. When the control unit 51 is connected to the control unit connector 23, the terminal base 24 is electrically connected to the control unit 51, and a signal input and output between the control unit 51 and an external equipment connected to the external electric lines is performed when the external electric lines are connected to the terminal base 24. Further, another type terminal base having a compatible pin arrangement with respect to the terminal base 24 may be mounted on the base plate 13 so that various interface devices are usable.

Figure 3:
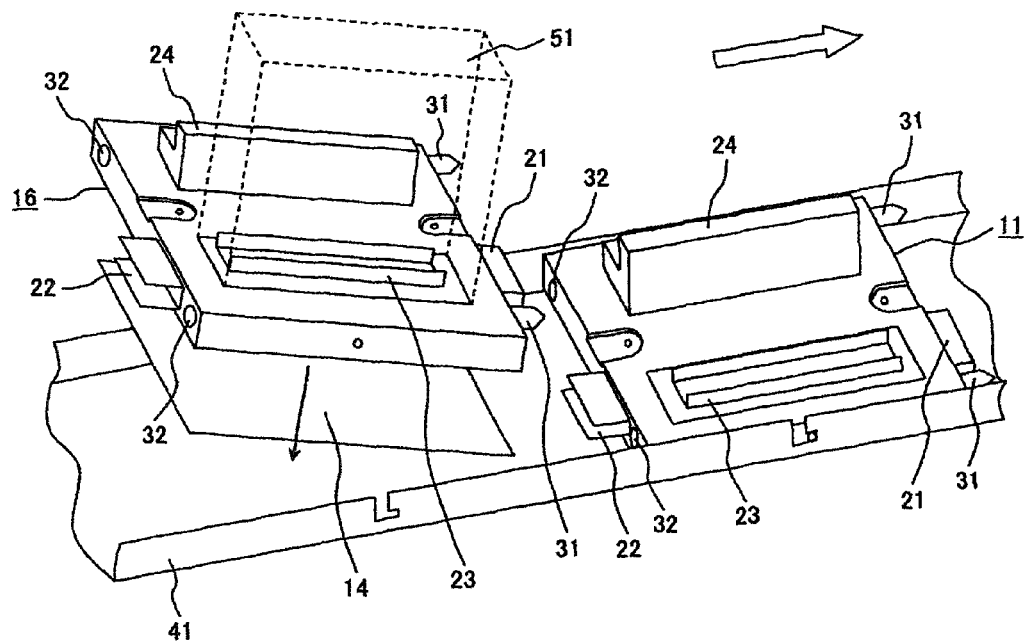
FIG. 3 is an oblique projection exploded view showing the base unit of the first embodiment just before being mounted onto a rail.

As shown in FIG. 3, when the control unit 51 is connected to the control unit connector 23, each of the base units 11, 16 is electrically connected to the rail 41 through the back panel 14 and the base plate 13 so that noise to be applied to the control unit 51 is released to a controller chassis through the rail 41. A longitudinal direction of the rail 41 shown by an arrow mark in FIG. 3 is directed substantially vertically. Each of the base units 11, 16 may be fixed to the rail by screws or the like other than a pin/slit engagement shown in FIG. 3.

Figure 4:
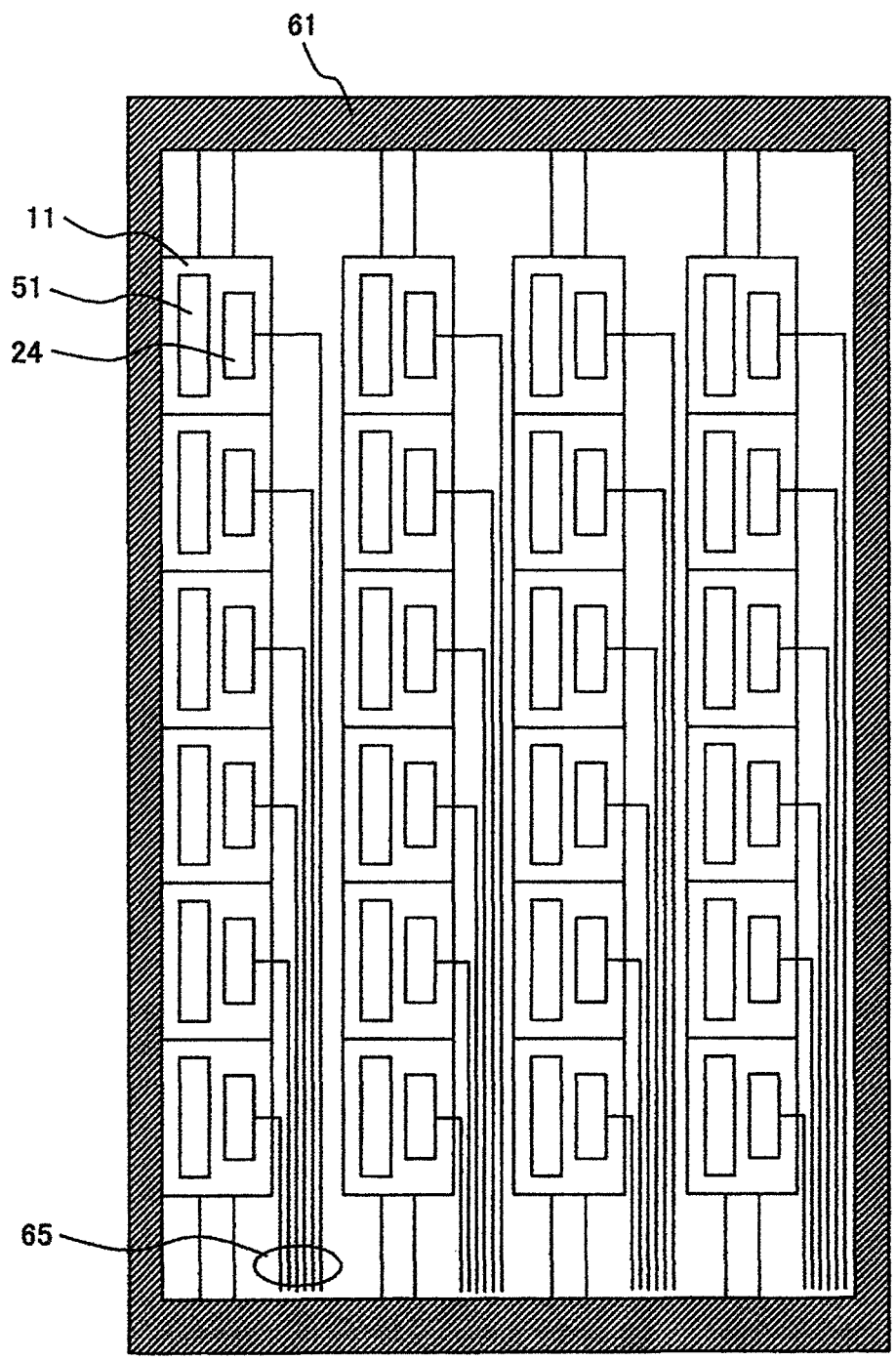
FIG. 4 is a schematic view showing the base unit of the first embodiment mounted on a controller chassis.

As shown in FIG. 4, a total number of the base units 11, 16 may be increased in accordance with a desired total number of the control units 51 in the controller chassis 61. Further, since the base units 11, 16 are juxtaposed vertically in the controller chassis 61, a total number of bendings of the electric lines is decreased in comparison with the prior art in which the base units are juxtaposed horizontally, the electric lines extending from the lower part of the controller chassis 61 can be connected to the control units 51 with a short time period.

Further, since the external electric lines 65 are connected to the terminal base 24 mounted on each of the base units 11, 16, the external electric lines 65 are prevented from being directly connected to the control unit 51 so that the removal of the external electric lines from the control unit 51 and connecting the external electric lines to the control unit 51 is necessary when exchanging the control unit 51.

Figure 5A:
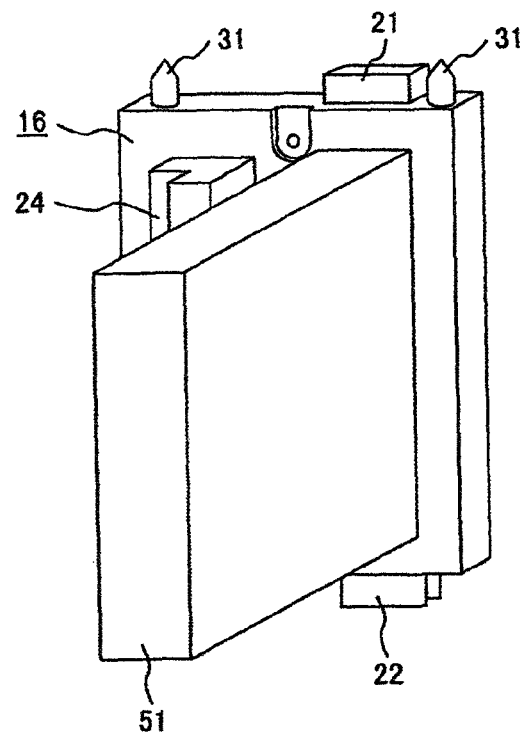
FIG. 5A is an oblique projection view showing a base unit of a second embodiment of the invention.
Figure 5B:
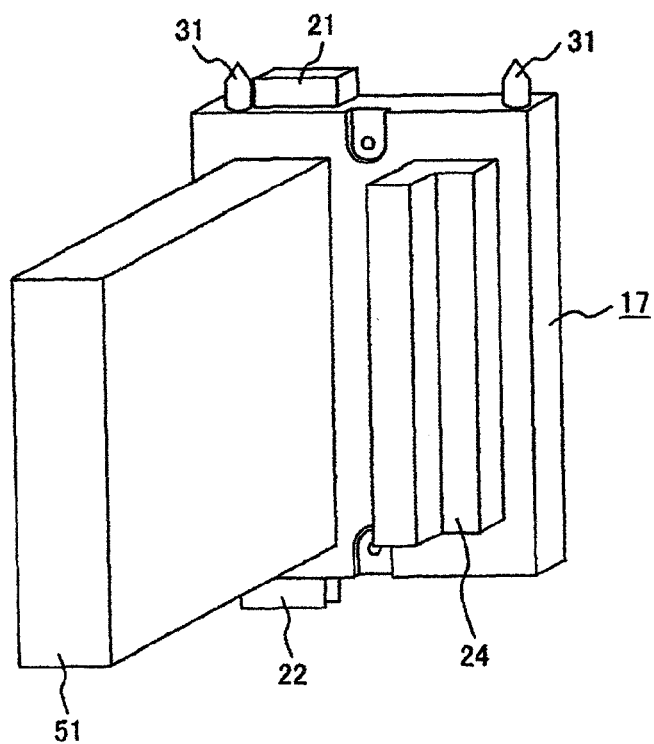
FIG. 5B is an oblique projection view showing another base unit of the second embodiment of the invention.
Figure 6:
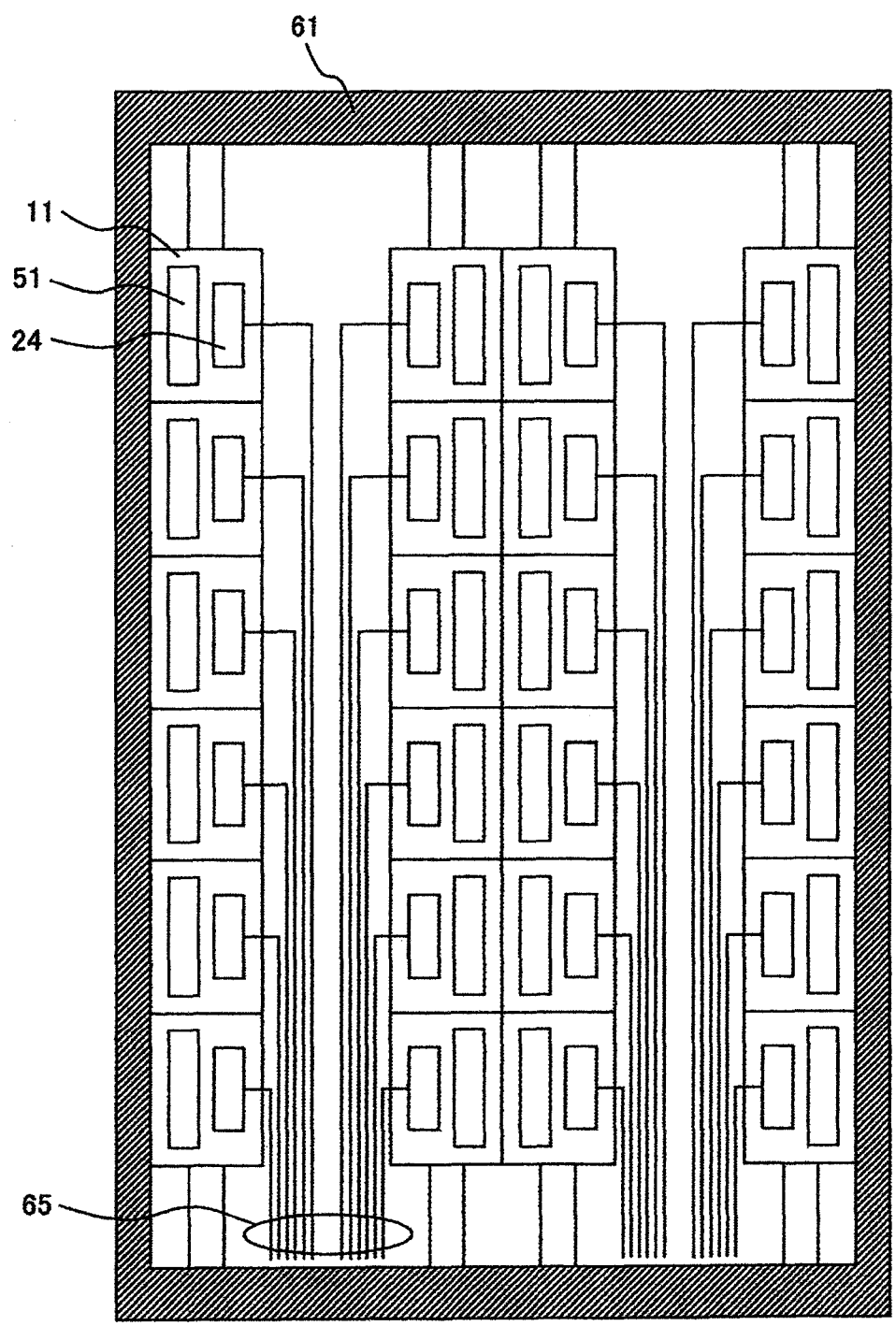
FIG. 6 is a schematic view showing the base unit of the second embodiment mounted on the controller chassis.

In a case of that the terminal base 24 is arranged on the identical side of the base unit, a wiring of the electric lines in the controller chassis 61 is complicated. Therefore, in a second embodiment of the invention as shown in FIGS. 5A and 5B, sides of base units 16, 17 on which sides the terminal base 24 are arranged respectively are opposite to each other in a direction perpendicular to the longitudinal direction of the rail 41 in which the base units 16, 17 are juxtaposed. Therefore, as shown in FIG. 6, the wiring of the external electric lines in the controller chassis 61 is simplified in comparison with the first embodiment, that is, bundles of the external electric lines may be gathered on two areas to decrease necessary working time period for the wiring, while in the first embodiment, the bundles of the external electric lines may be gathered on four areas.

Although the sides of base units 16, 17 on which sides the terminal base 24 are arranged respectively are opposite to each other, the common control units 51 are usable for the base units 11, 16, 17. Therefore, an additional cost is not caused, and the control units 51 can be modified commonly without considering a difference among the base units 11, 16, 17.

Figure 7:
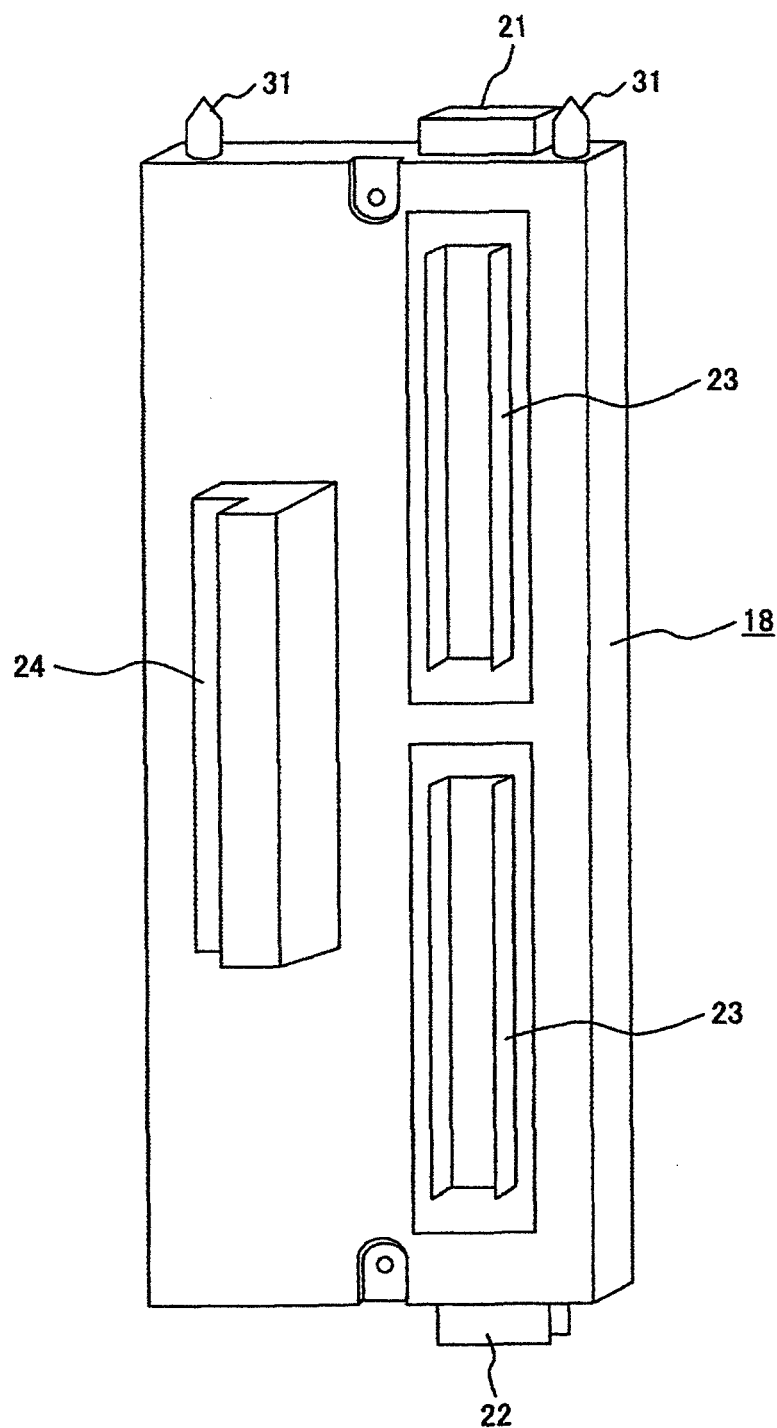
FIG. 7 is an oblique projection view showing a base unit of a third embodiment of the invention.

As a third embodiment of the invention, a base unit 18 including at least two of the control unit connectors 23 as shown in FIG. 7 is usable as substitute for the base units 11, 16, 17. The base unit 18 can distribute an input signal between a plurality of the control units 51, or can output a signal as logical sum or product of output signals from the control units 51.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A multi unit controller comprising
   a plurality of base units each of which includes a control unit connector,
   a base unit connector through which the base units juxtaposed to each other are connected to each other, and
   a plurality of control units connected to the base units respectively through the respective control unit connector,
   wherein the base units are juxtaposed to each other vertically.

2. The multi unit controller according to claim 1, wherein the base unit connector has an upper connector arranged on an upper surface of one of the base units, and a lower connector arranged on a lower surface of the other one of the base units to be connected to the one of the base units.

3. The multi unit controller according to claim 1, wherein each of the base units includes a terminal base through which the control unit is electrically connected to an electric line connected to an external equipment.

4. The multi unit controller according to claim 3, wherein a direction from the terminal base of one of the base units toward the control unit connector of the one of the base units and another direction from the terminal base of the other one of the base units toward the control unit connector of the other one of the base units are opposite to each other.

5. The multi unit controller according to claim 1, wherein the base unit connector includes an electric line connecting the base units to each other.

6. The multi unit controller according to claim 1, wherein the controller further comprises a controller chassis for receiving the base units, and a rail through which the base units are fixed to the controller chassis, and the rail and each of the base units are electrically connected to each other to discharge to the controller chassis electric noise applied to the control unit.

7. A multi unit controller to be connected to electric lines to control an external equipment, comprising:

a plurality of base units, and a plurality of control units connected to the base units respectively, wherein each of the base units has a terminal base to which respective one of the electric lines is electrically connected, and a control unit connector onto which respective one of the control units is detachably mounted so that the respective one of the electric lines is electrically connected to the respective one of the control units through the terminal base and the control unit connector to control the external equipment from at least one of the control units, and wherein at least two of the base units are juxtaposed to each other vertically and connected through a base unit connector.

8. The multi unit controller according to claim 7, wherein the terminal base has a plurality of terminals capable of being electrically connected to a plurality of the electric lines respectively, and the terminals on the terminal base are juxtaposed in a direction in which the base units contacting each other are juxtaposed.

9. The multi unit controller according to claim 7, wherein one of the base units has the base unit connector, the other one of the base units has a connector receiver, and an electric connection between the base unit connector and the connector receiver is capable of being formed and released by moving the base unit connector and the connector receiver with respect to each other in a direction in which the base units are juxtaposed.

10. The multi unit controller according to claim 7, wherein a first one of the base units and a second one of the base units contact each other and are juxtaposed in a first direction, a third one of the base units and the first one of the base units are juxtaposed in a second direction perpendicular to the first direction, one of the first direction and the second direction being a vertical direction, the control unit connectors of the first and third ones of the base units are arranged between the terminal bases of the first and third ones of the base units in the second direction.

\* \* \* \* \*